(12) United States Patent
Wright

(10) Patent No.: US 8,219,729 B1
(45) Date of Patent: Jul. 10, 2012

(54) ENUMERATION CIRCUITS, STRUCTURES AND METHODS FOR HOST CONNECTED DEVICES

(75) Inventor: David G. Wright, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 305 days.

(21) Appl. No.: 12/685,628

(22) Filed: Jan. 11, 2010

(51) Int. Cl.
*G06F 13/00* (2006.01)

(52) U.S. Cl. ........................................ 710/104

(58) Field of Classification Search .................. 710/104
See application file for complete search history.

(56) References Cited

U.S. PATENT DOCUMENTS

| | | | | |
|---|---|---|---|---|
| 6,128,743 A * | 10/2000 | Rothenbaum | ................. | 713/300 |
| 7,329,969 B2 * | 2/2008 | Niinuma | ....................... | 307/130 |
| 7,510,420 B2 * | 3/2009 | Mori | .............................. | 439/446 |
| 7,631,200 B2 * | 12/2009 | Niwa et al. | .................... | 713/300 |
| 7,698,490 B2 * | 4/2010 | Terrell, II | ...................... | 710/302 |
| 7,909,624 B2 * | 3/2011 | Iida | ................................ | 439/131 |
| 2004/0225804 A1 * | 11/2004 | Leete | ........................... | 710/305 |
| 2005/0141208 A1 * | 6/2005 | Niinuma | ....................... | 361/797 |
| 2006/0117195 A1 * | 6/2006 | Niwa et al. | .................... | 713/300 |
| 2010/0246857 A1 * | 9/2010 | Kajita | .......................... | 381/120 |

* cited by examiner

*Primary Examiner* — Ryan Stiglic

(57) ABSTRACT

An apparatus may include a first connector having at least a first host communication path for connection to a host device, a second connector that physically alters at least a first signal path in response to a physical connection at the second connector, and a controller section that communicates a first set of configuration information over the first host communication path when the first signal path is in an unaltered state, and a second set of configuration information when the first signal path is in an altered state.

20 Claims, 10 Drawing Sheets

(Plug Not Inserted)

(Plug Partially Inserted)

(Plug Fully Inserted)

US 8,219,729 B1

ENUMERATION CIRCUITS, STRUCTURES AND METHODS FOR HOST CONNECTED DEVICES

TECHNICAL FIELD

The present disclosure relates generally to devices attachable to a controlling host, and more particularly to devices and methods for altering identification information for a device in response to a physical attachment to the device.

DETAILED DESCRIPTION

Figure 1A:
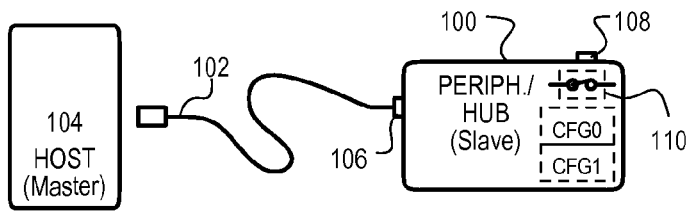
FIGS. 1A to 1F are block diagrams showing a system, corresponding devices and methods according to various embodiments.

Various embodiments will now be described that show devices, methods and circuits for mechanically and/or physically simulating a disconnection of a device from a host controller in response to a separate mechanical connection to (and/or disconnection from) the device. Such a mechanically and/or physically simulated disconnection may enable a host controller to re-identify the device and the device's capabilities, including new capabilities arising from the separate mechanical connection.

In particular embodiments, a device may be a Universal Serial Bus (USB) compatible device that may trigger a host enumeration operation (i.e., re-enumeration) in response to a mechanical connection physically altering a signal path. In a very particular embodiment, a device may be a USB compatible hub device that may be re-enumerated between bus-powered or self-powered hub configurations based on the disconnection or connection at an external power supply connector, separate from a host connected port.

Referring now to FIGS. 1A to 1F, methods and devices according to particular embodiments will now be described with reference to a sequence of diagrams. FIGS. 1A to 1F shows a downstream device 100, a communication path 102, and a host device 104. A downstream device 100 may be connected to host device 104 by communication path 102.

A device 100 may be conceptualized as being a "downstream" device in that it may receive command data from host device 104, which may be considered a "downstream" direction, and then return response data back to the host device 104 in an "upstream" direction.

A downstream device 100 may perform predetermined operations in response to inputs, including inputs from host device 104. Further, according to a predetermined protocol, downstream device 100 may provide identification information to a host device 104. Such identification information may indicate a current configuration for the downstream device 100, and/or current functions the downstream device 100 is capable of performing. In some embodiments, a downstream device 100 may have different functions and/or modes of operation depending upon a physical connection to the downstream device 100.

As shown in FIGS. 1A to 1F, a downstream device 100 may include an upstream connection 106, a non-host physical connector 108, and a physically alterable signal path 110. An upstream connection 106 may include communication inputs/outputs for communicating with host device 104, either directly, or through on or more other devices disposed between downstream device 100 and host device 104. Non-host physical connector 108 may provide for the physical attachment of some other device to downstream device 100 that is not in communication with host device 100. Further, a connection or disconnection at physical connector 108 may physically change a state of signal path 110.

Referring to FIG. 1A, initially, a downstream device 100 may not be connected to a host device 104 (either directly or via one or more other devices). In addition, it is assumed that there is no physical connection at connector 108, and consequently, a signal path 110 may have a first physical state. In the particular embodiment shown, this first physical state may have a "closed switch" type arrangement, in which physical contact is made the enables an electrical signal path.

Figure 1B:
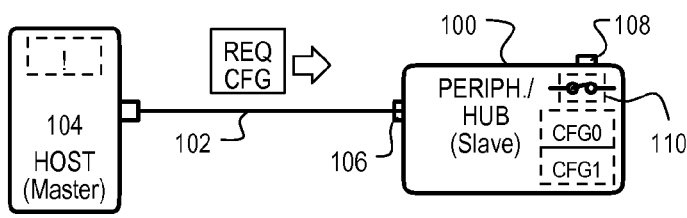

Referring to FIG. 1B, a downstream device 100 may be connected to a host device 104. In the embodiment shown, such a connection may be through a communication path 102. It is understood that a communication path 102 could include one or more intervening devices. In response to the connection at upstream connection 106, a downstream device 100 may generate a status change indication for detection by host device 104. In particular embodiments, a status change indication may be an apparent disconnection (or removal) of a downstream device with respect to the host device 104. Host device 104 may detect such a status change, and in response, request identification information (REQ CFG) from downstream device 104.

Figure 1C:
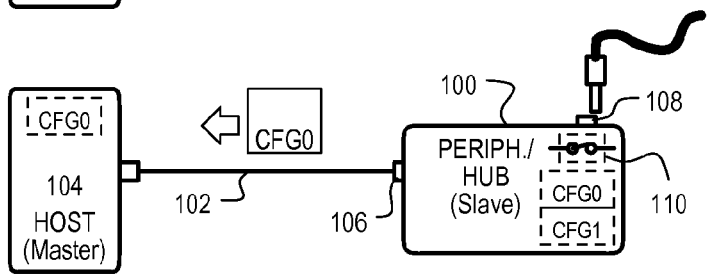

Referring to FIG. 1C, downstream device 100 may provide identification information (CFG0) to host device 104. Such identification information may enable host device 104 to establish the type of device and/or functions presently available for downstream device 100. A host device 104 may thus enable applications to access downstream device 100 to take advantage of the functions indicated by identification information (CFG0). In very particular embodiments, this may represent the "enumeration" of downstream device 100.

Figure 1D:
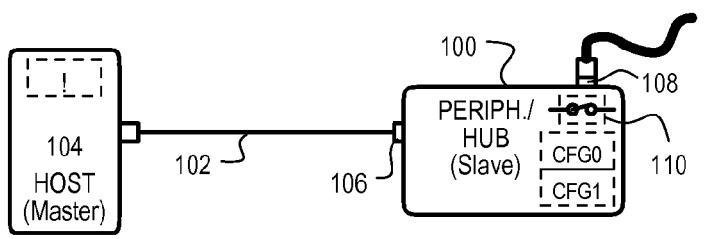

Referring to FIG. 1D, while downstream device 100 continues to have a communication path 102 with host device 104, a physical connection may be made at connector 108 for a secondary device (not shown). As noted above, attachment of a secondary device may enable additional functions, disable existing functions, or otherwise alter an operation of downstream device 100. Further, in response to the physical attachment, a signal path 110 may change from a first physical state to a second physical state. In the particular embodiment shown, this second physical state may have an "open switch" type arrangement, in which a physical separation is made to conductive elements in an electrical signal path, to thereby break such a signal path.

Referring still to FIG. 1D, the physical alteration of signal path 110 may generate a new status change indication for detection by host device 104. In some embodiments, original communication path 102 may remain in place, while in other embodiments some or all electrical connections with a host 104 may be disconnected. Host device 104 may detect such a new status change if communication path 104 remains in place and/or is reestablished.

Figure 1E:
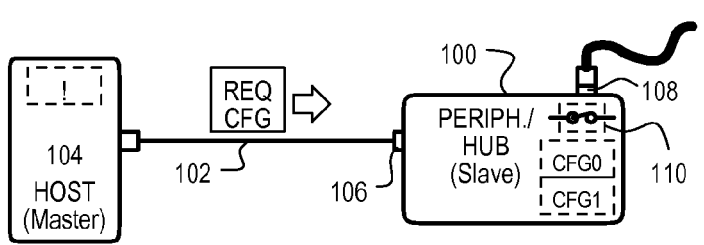

Referring to FIG. 1E, in response to detecting a status change indication, a host device 104 may once again request identification information (REQ CFG) from downstream device 100.

Figure 1F:
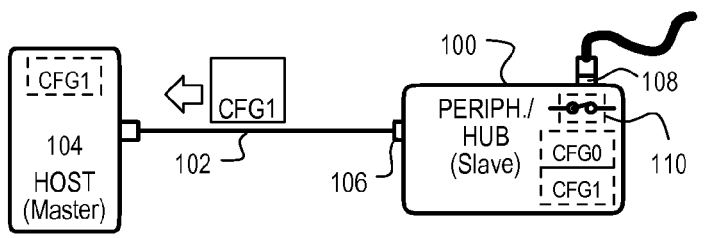

Referring to FIG. 1F, a downstream device 100 may provide new identification information (CFG1) to host device 104, reflecting changes in functions resulting from the physical connection at connector 108. Such identification information may enable host device 104 to re-establish the type of device and/or functions now available for downstream device 100, as opposed to those available from the previous enumeration operation (e.g., FIGS. 1B and 1C). A host device 104 may thus enable applications to access downstream device 100 to take advantage of the new functions indicated by the new identification information (CFG1). In very particular embodiments, this may be conceptualized as "re-enumeration" of downstream device 100.

In particular embodiments, a host device 104 may be "master" device, and downstream device 100 may be a "slave" device that may follow commands issued from the master device according to a predetermined protocol.

In one very particular embodiment, a host device 104 may be a Universal Serial Bus (USB) compatible host, and a downstream device 100 may be a USB compatible hub or a USB compatible peripheral device.

In this way, in response to a connection physically altering a signal path, a downstream device may provide identification information to a host device to define changes in operation resulting from the physical connection.

Figure 2:
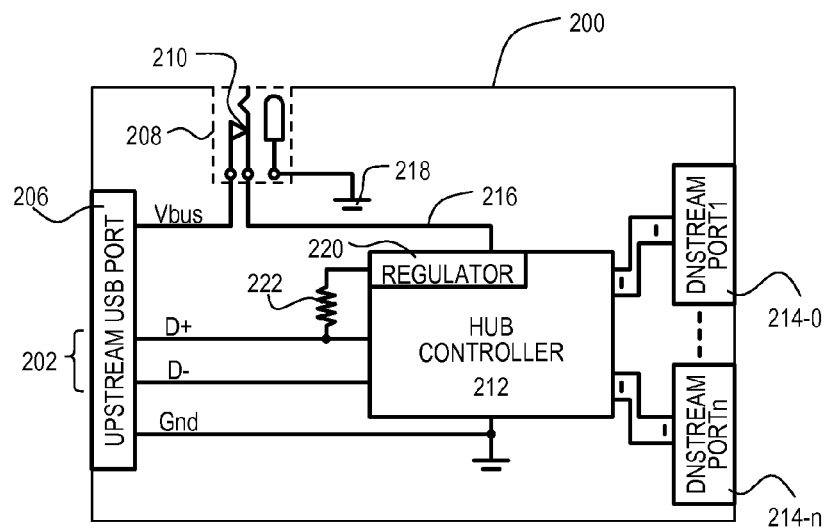
FIG. 2 is a schematic diagram of a downstream device according to an embodiment.

Referring to FIG. 2, one very particular embodiment of a downstream device is shown in a block schematic diagram and designated by the reference character 200. A downstream device 200 may be one example of that shown as 100 in FIG. 1.

A downstream device 200 may be a USB hub device, and may include an upstream port 206, a physical connector 208, a hub controller circuit 212, and a number of downstream ports 214-0 to 214-$n$. A USB hub device 200 may enable communications between upstream port 206 and any of downstream ports (214-0 to 214-$n$). USB hub device 200 may have at least two different configurations, including a "bus powered" configuration and a "self-powered" configuration. In a bus-powered configuration, USB hub device 200 may receive operational power by way of bus power supply input (Vbus) at upstream port 206. In a self-powered configuration, a USB hub device 200 may receive power via an external connection, separate from upstream port 206.

Upstream port 206 may include host communication connections (D+/D−) for receiving/transmitting data to a host device, a bus power supply connection (Vbus), and a bus reference power connection (Gnd). While the embodiment of FIG. 2 shows bi-directional host communication connections (D+/D−), other embodiments may include uni-directional communication links in addition to, or as an alternative for, bi-directional links. In FIG. 2, host communication connections (D+/D−), and bus reference power supply connection (Gnd) may be provided to hub controller circuit 212. Bus power supply (Vbus) may be provided to physical connector 208.

Physical connector 208 may provide a connection point for an external power supply that may enable USB hub device 200 to be self-powered. More particularly, when an external power supply is not connected at connector 208, USB hub device 200 may be bus-powered, and when an external power supply is connected at connector 208, a USB hub device 200 may be self-powered.

In FIG. 2, connector 208 may be connected to a bus power supply (Vbus), an internal power supply node 216, and an internal ground node 218. Connector 208 may also include a physically alterable signal path 210 between bus power supply (Vbus) and an internal power supply node 216. In particular, when an external power supply is not connected at connector 208, signal path 210 may physically connect bus power supply (Vbus) to internal power supply node 216. When an external power supply is connected at connector 208, bus power supply (Vbus) may be physically disconnected from internal power supply node 216, and an external power supply voltage may be provided to internal power supply node 216.

A hub controller circuit 212 may provide hub functions, including responding to host requests for identification information on host communication connections (D+/D−), and controlling data transfers between upstream port 206 and downstream ports 214-0 to 214-$n$. In the very particular embodiment shown, hub controller 212 of FIG. 2 may include a voltage regulator 220 to regulate a voltage on internal power supply node 216 and provide such a voltage to hub controller circuit 212. In addition, a pull-up resistor 222 may be present between host communication connection D+ and a regulated power supply voltage. In response to an interruption of power at internal power supply node 216, voltage regulator 220 may interrupt a regulated power supply voltage to pull-up resistor 222.

Downstream ports 214-0 to 214-$n$ may be USB compatible ports for connection to peripheral USB devices and/or other USB hub devices. Hub controller circuit 212 may control transfers of communication between upstream port 206 and any of downstream ports 214-0 to 214-$n$.

In a particular embodiment, a hub controller circuit 212 may be an integrated circuit device, and pull-up resistor 222 may be either separate from such an integrated circuit device or a sub-circuit of such an integrated circuit.

Having described the general components of a USB hub device 200, particular operations of such a device will now be described.

In a first operation it will be assumed that an external power supply is not connected at connector 208, thus signal path 210 may be closed (e.g., physically provide an electrical signal path). Subsequently, a host device (not shown) may be connected (directly or via other devices) at upstream port 206. Upon detection of USB hub device 200, a host device may request identification information from USB hub device 200. A USB hub device 200 may return information that identifies it as a bus powered device (i.e., it is enumerated as bus powered).

After USB hub device 200 has been enumerated as bus powered, an external power supply may be connected at connector 208. Such a physical connection may open signal path 210 (e.g., physically prevent an electrical signal path from Vbus to internal power supply node 216), while providing an external power supply to internal power supply node 216. In a particular embodiment, connector 208 may provide a "break-before-make" type connection action. That is, as a power supply connector is attached, signal path 210 may be opened (break) before an external power supply provided to internal power supply node 216. In one embodiment, the opening of signal path 210 may cause an interruption in a supply voltage to voltage regulator 220, which may interrupt power provided to pull-up resistor 222, allowing host communication connection D+ to fall in potential. Such a drop at host communication connection D+ may function as a status change indication signal to a host device (for example, being interpreted as the physical disconnection of USB hub device 200 from a host). Subsequently, the application of the external power supply will result in a power supply being applied once again to pull-up resistor 222. In some embodiments, the application of an external power supply to pull-up resistor 222 may be automatic upon connection of an external power supply. However, in other embodiments re-application of power to pull-up resistor 222 may be delayed by hub controller 212 until a USB device 200 is ready to resume operations. In addition or alternatively, re-application of power to pull-up resistor 222 may be delayed by hub controller 212 to ensure a host may detect such a disconnection event. As but one very particular embodiment, some USB hosts may require as long as 1500 ms between disconnection of power and re-application of power to a pull-up resistor 222 to reliably detect the disconnection event. Hub controller circuit 212 may detect the connection at connector 208 (e.g., by internal ground node, or some other method), to determine that it is now self-powered.

Upon detection of the status change indication (e.g., drop at D+), a host device may determine a disconnection and reconnection has occurred, and request identification information from USB hub device 200. USB hub device 200 may return information that identifies it as a self-powered device (i.e., it is re-enumerated as self-powered).

A second operation may be the opposite of the first operation. In a second operation, it will be assumed that an external power supply is connected at connector 208, thus signal path 210 may be opened. Subsequently, a host device (not shown) may be connected (directly or via other devices) at upstream port 206. Upon detection of USB hub device 200, a host device may request identification information from USB hub device 200. A USB hub device 200 may return information that identifies it as a self-powered device (i.e., it is enumerated as self-powered).

After USB hub device 200 has been enumerated as self-powered, an external power supply may be disconnected at connector 208. Such a physical disconnection may remove an external power supply at internal power supply node 216 and close signal path 210. The removal of the external power supply may cause an interruption in a supply voltage to voltage regulator 220 generating a status change indication for host device on communication connection D+. Subsequently, the closing of signal path 210 and the application of bus power (Vbus) may result in a regulated power supply being applied once again to pull-up resistor 222. Hub controller circuit 212 may detect the disconnection at connector 208 to determine that it is now bus-powered.

Upon detection of the status change indication (e.g., drop at D+), a host device may determine a disconnection and reconnection has occurred, and request identification information from USB hub device 200. USB hub device 200 may return information that identifies it as a bus-powered device (i.e., it is re-enumerated as bus-powered).

In this way, a USB hub device may be enumerated and re-enumerated as self-powered or bus powered based on the physical connection or disconnection of an external power supply, without being physically disconnected from a USB host device communication path.

A physical connector for the embodiments described herein may take various forms, including plug receptacle forms. Particular plug receptacle connectors that may be included in embodiments will now be described.

Figure 3A:
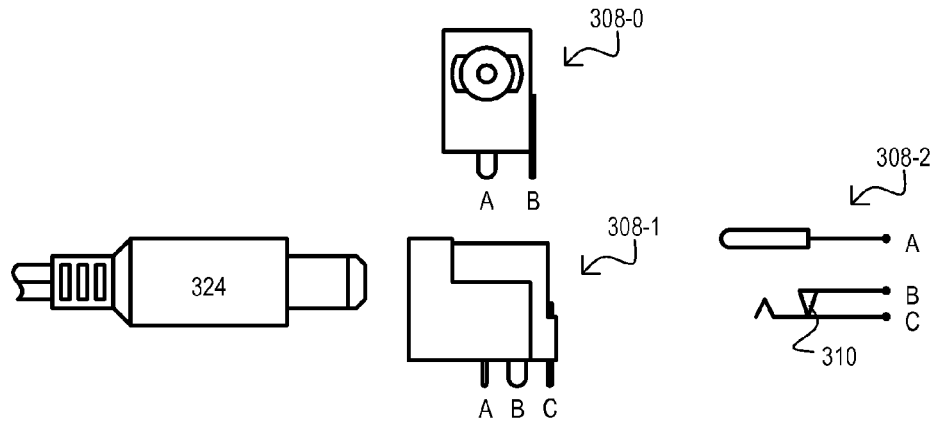
FIGS. 3A and 3B are various views showing a connector that may be included in embodiments.
Figure 3B:
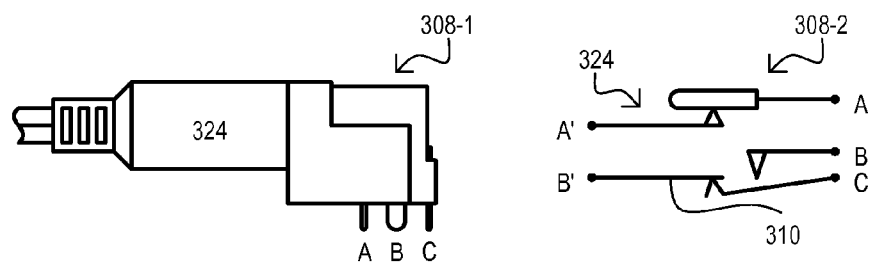

Referring to FIGS. 3A and 3B, a connector that may provide a physically alterable signal path for an embodiment is shown in a series of views, and designated by the reference characters 308-0, -1, and 2. Connector 308-0/1/2 may be a connector type often referred to as "center negative" direct-current (DC) receptacle, that may have three terminals shown as A, B and C.

Referring to FIG. 3A, connector 308-0 shows a front plan view, connector 308-1 shows a side plan view, and connector 308-2 is a schematic diagram. FIG. 3A also shows a plug 324 that may be inserted into connector 308-0/1/2 to create a physical connection with the connector. FIG. 3A shows connector 308-0/1/2 in an unconnected state (i.e., plug 324 is not inserted). In an unconnected state, as represented by schematic view 308-2, terminal B may be electrically connected to terminal C by a physical connection of conductive elements within connector 308-0/1/2.

Referring to FIG. 3B, connector 308-1/2 is shown in a connected state (i.e., plug 324 is inserted). In a connected state, as represented by schematic view 308-2, an insertion of plug 324 may result in (1) a plug terminal A' making physical contact with conductive elements to create an electrical path to terminal A of connector 308-2, (2) plug terminal B' making physical contact with conductive elements to create an electrical path to terminal C of connector 308-2, and (3) connector terminal C being physically disconnected from connector terminal B.

In particular embodiments, a plug 324 may be designed to provide a break-before-make type connection. That is, connector terminal C is disconnected from terminal B before plug terminal B' is connected to connector terminal C.

Thus, insertion of plug 324 into plug receptacle connector 308-0/1/2 may alter a signal path between terminals B and C (open a connection previously closed) and/or alter a signal path at terminal A (provide signal to such a terminal).

Figure 4:
FIG. 4 is a schematic diagram showing another connector that may be included in embodiments.

Referring to FIG. 4, another connector is shown in a schematic view and designated by the general reference character 408. A connector 408 may include terminals A, B, C and D. In an unconnected state (e.g., plug not inserted), terminal A may have a conductive path to terminal B by way of physical contact of conductive members within connector 408. Similarly, terminal C may have a conductive path to terminal D by way of physical contact of conductive members within connector 408. In a connected state (e.g., plug inserted), a signal path between terminals C and D may be opened by physical separation of conductive elements. In addition or alternatively, a signal path between terminals A and B may be opened by physical separation of conductive elements. In a very particular embodiment, a connector 408 may take the form of an "audio type" jack receptacle.

Figure 5:
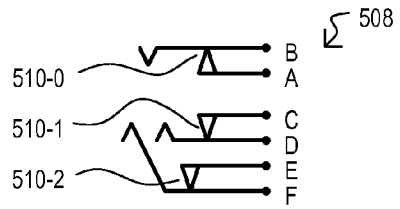
FIG. 5 is a schematic diagram showing yet another connector that may be included in embodiments.

Referring to FIG. 5, another connector is shown in a schematic view and designated by the general reference character 508. A connector 508 may include terminals A, B, C, D, E and F. In an unconnected state, physical contact of conductive members enables electrical signal paths between terminal pairs NB, C/D, and E/F. In a connected state, physical separation of conductive members may disable any or all of signals between terminal pairs A/B, C/D or E/F. In a very particular embodiment, a connector 408 may take the form of a "stereo audio" type of jack receptacle.

In this way, various plug/jack receptacles may provide a physically alterable signal path for generating a state change for detection of a host device, to enable new identification information to be provided to the host device.

A physical connector for the embodiments described herein may also include other mechanical arrangements, including structures that are in the physical path of an inserted member. When a member is inserted, movement of such structures physically alters a signal path to thereby detect a physical connection at the connector. Particular examples of such connection detectors will now be described.

Figure 6A:
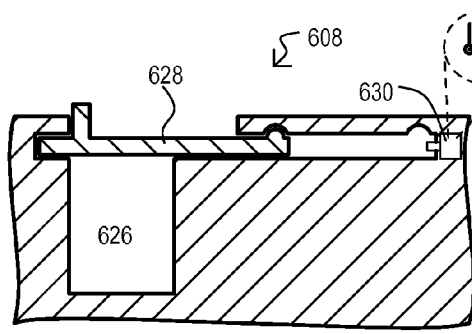
FIGS. 6A and 6B are side cross sectional representations showing a connection detector that may be included in the embodiments.
Figure 6B:
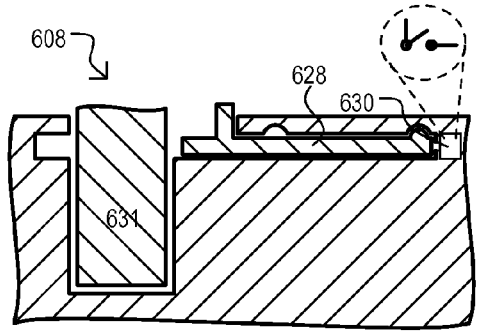

Referring to FIGS. 6A and 6B, a connection detector that may be included in embodiments is shown in a cross sectional view and designated by the general reference character 608. A connector 608 may include a receptacle opening 626, a sliding door 628, and a mechanical switch 630. FIG. 3A shows connector 608 in an unconnected state. In an unconnected state, sliding door 628 may be in a closed position, covering receptacle opening 626. In such an arrangement, mechanical switch 630 may have a first state (in this example, closed).

Referring to FIG. 6B, connector 608 is shown in a connected state. In a connected state, a sliding door 628 may be in an open position, revealing receptacle opening 626 to enable a structure 631 to be inserted therein (e.g., jack, plug etc.). In the open position, sliding door 628 may make a connection with mechanical switch 630, which causes the switch to change states (in this example switch from closed to open).

Figure 7A:
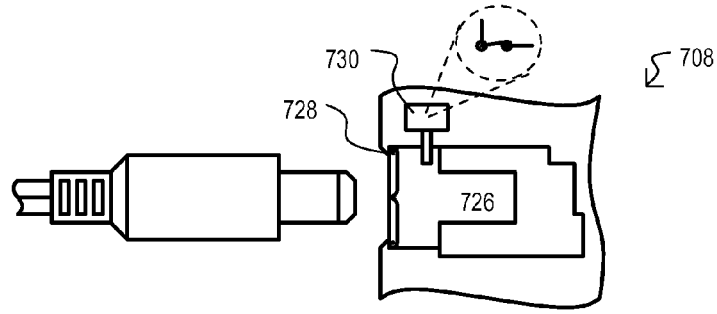
FIGS. 7A and 7B are side cross sectional representations showing another connection detector that may be included in the embodiments.
Figure 7B:
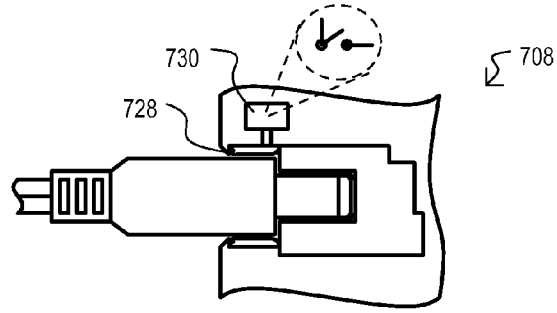

Referring to FIGS. 7A and 7B, another connection detector that may be included in embodiments is shown in a cross sectional view and designated by the general reference character 708. A connector 708 may include a receptacle opening 726, hinged door structure 728, and a mechanical switch 730. FIG. 7A shows connector 708 in an unconnected state. In an unconnected state, hinged door structure 728 may be in a closed position, covering receptacle opening 726. In such an arrangement, mechanical switch 730 may have a first state (in this example, closed).

Referring to FIG. 7B, a connector 708 is shown in a connected state. In a connected state, an inserted member may force hinged door structure 728 into an open position as it is inserted into receptacle opening 726. In the open position, hinged door structure door 728 may make a connection with mechanical switch 730, which causes the switch to change states (in this example switch from closed to open).

Figure 8:
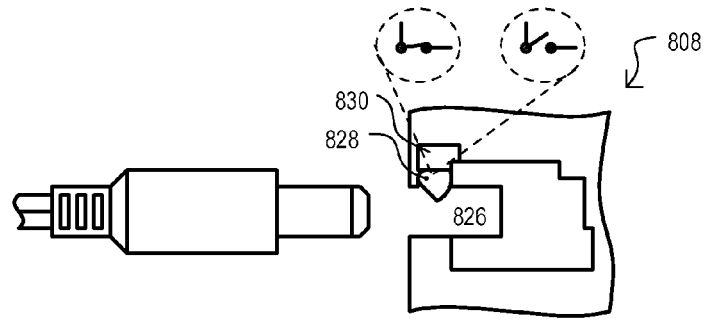
FIG. 8 is a side cross sectional representation of a further connection detector that may be included in the embodiments.

Referring to FIG. 8, still another a connection detector that may be included in embodiments is shown in a cross sectional view and designated by the general reference character 808. A connector 808 may include a receptacle opening 826, an internal moveable member 828, and a mechanical switch 830. Moveable member 828 may not be readily visible. FIG. 3A shows connector 808 in an unconnected state. In an unconnected state, moveable member 828 may have a first position causing mechanical switch 830 to have a first state (in this example, closed). However, in a connected state, an inserted member may move movable member 828 causing mechanical switch 830 to change states (in this example switch from closed to open).

It is noted that while FIGS. 3A to 8 show specific connector examples, other embodiments may include alternate and equivalent structures.

In this way, a connector included in the embodiments to provide a physically alterable signal path may take various forms.

Figure 9:
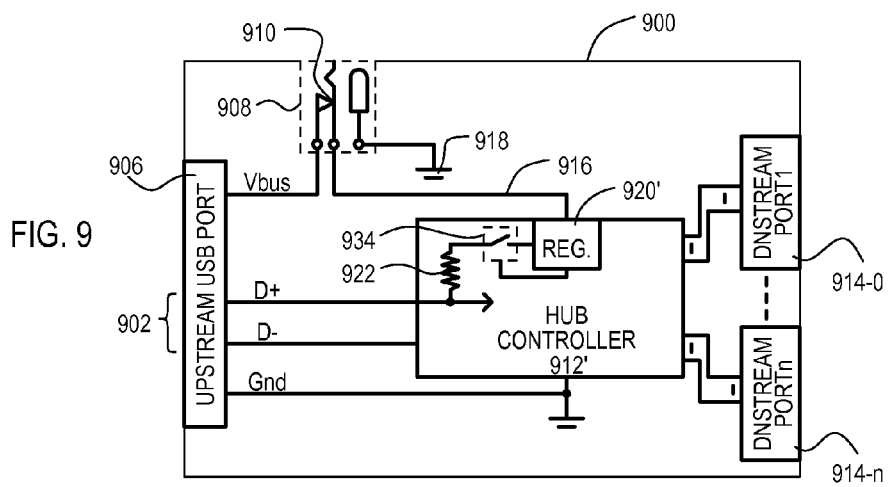
FIG. 9 is a schematic diagram of a downstream device according to a further embodiment.

Referring to FIG. 9, another embodiment of a downstream device is shown in a block schematic diagram and designated by the general reference character 900. A downstream device 900 may be one example of that shown as 100 in FIG. 1. A downstream device 900 may include sections like those shown in FIG. 2. Accordingly, like sections are referred to by the same reference character but with the first digit being a "9" instead of a "2".

Downstream device 900 may differ from that of FIG. 2 in that an interrupt switch device 934 may be situated between a pull-up resistor 922 and a regulated voltage provided by voltage regulator 920'. A voltage regulator 920 may disable or enable interrupt switch device 934 in response to changes at internal power supply node 916.

In this way, a change at host communication connection D+(indicating a status change) may be generated for a predetermined duration that may substantially ensure a host device detects a change in state connection at connector 208.

In a particular embodiment, a hub controller circuit 912' may be an integrated circuit device that includes both pull-up resistor 922 and interrupt switch device 934. In another embodiment, pull-up resistor 922 may be external to a hub controller circuit 912'.

Having described the general components of a USB hub device 900, particular operations of such a device will now be described.

In a first operation it will be assumed that an external power supply is not connected at connector 908 and signal path 910 may be closed. When a host device (not shown) is connected at upstream connection 906, a USB hub device 900 may be enumerated as bus powered.

After USB hub device 900 has been enumerated as bus powered, an external power supply may be connected at connector 908. Such a physical connection may open signal path 910 and provide an external power supply to internal power supply node 916. In particular embodiments, connector 908 may provide a break-before-make type connection. As a result, a resulting temporary loss of power to hub controller 912' may cause a reset and restart operation for hub controller 912'. Interrupt switch device 934 may open. After a delay sufficient to help ensure that a host device detects the drop on D+, interrupt switch device 934 may return to a closed position.

It is noted that upon reset and restart, a hub controller 912' may be capable of determining a source of power to regulator 920' to thereby provide appropriate configuration information (e.g., bus-powered or self-powered) to a host. In one embodiment, a voltage provided by an external power supply may be different from that provided by a bus power supply. Regulator 920' may detect such a difference to determine a configuration status. As but one example, a voltage provided by an external power supply may be in the range of about 5.5 V to 6 V, while a bus power supply voltage may be in the range of about 4.3 V to 5.25 V.

A second operation may be the opposite of the first operation. In a second operation, it will be assumed that an external power supply is connected at connector 908, thus signal path 910 may be opened. A USB hub device 900 may be enumerated as self-powered.

After USB hub device 900 has been enumerated as self-powered, an external power supply may be disconnected at connector 908. Such a physical disconnection may remove an external power supply at internal power supply node 916 and close signal path 910. In particular embodiments, such a disconnection may be a "break-before-make" arrangement so that power to internal power supply node 916 is lost from signal path 910 before it is regained from bus power supply voltage Vbus. A resulting temporary loss of power to hub controller 912' may cause a reset and restart operation for hub controller 912' and an opening of interrupt switch device 934 resulting in a drop of potential at host communication connection D+. After a delay sufficient to enable a host device to detect the drop on D+, interrupt switch device 934 may return to a closed position.

In this way, a USB hub device may be enumerated and re-enumerated as self-powered or bus powered by activating a switching device in response to the physical connection or disconnection of an external power supply.

Figure 10:
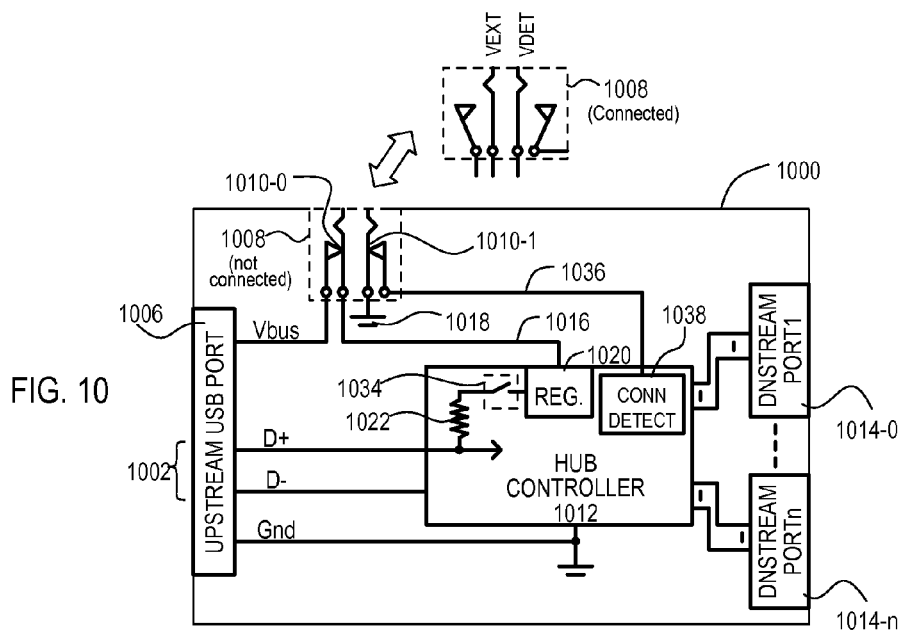
FIG. 10 is a schematic diagram of a downstream device according to another embodiment.

Referring to FIG. 10, a downstream device according to a further embodiment is shown in a block schematic diagram and designated by the general reference character 1000. A downstream device 1000 may be one example of that shown as 100 in FIG. 1. A downstream device 1000 may include sections like those shown in FIG. 2. Accordingly, like sections are referred to by the same reference character but with the leading digits being "10" instead of a "2".

The embodiment of FIG. 10 may differ from that of FIG. 2 in that a physical connector 1008 may have a structure like that of FIG. 4. Accordingly, connector 1008 may include first physically alterable signal path 1010-0 and a second physically alterable signal path 1010-1. In the very particular embodiment shown, in the absence of a physical connection at connector 1008 (not connected), first signal path 1010-0 may provide a signal path between a bus supply (Vbus) and internal power supply node 1016 and second signal path 1010-1 may provide a signal path between an internal ground node 1018 and a detect signal path 1036. In contrast, and as shown by the arrow, a physical connection is made at connector 1008 (Connected), first signal path 1010-0 may physically disconnect bus supply (Vbus) from internal power supply node 1016 and physically connect an external power supply (VEXT) to internal power supply node 1016. In addition, second signal path 1010-1 may physically disconnect detect signal path 1036 from internal ground node 1018, and connect a signal voltage (VDET) to detect signal path 1036.

Like the embodiment of FIG. 9, downstream device 1000 may include an interrupt switch device 1034 between a pull-up resistor 1022 and a regulated voltage provided by voltage regulator 1020. A connection detect circuit 1038 may disable or enable interrupt switch device 1034 based on a voltage at detect signal path 1036.

In a particular embodiment, a hub controller circuit 1012 may be an integrated circuit device that includes pull-up resistor 1022, interrupt switch device 1034, and connection detect circuit 1038. In another embodiment, one or more of these elements may be external to the hub controller.

Having described the general components of a USB hub device 1000, particular operations of such a device will now be described.

In a first operation it is assumed that there is no connection at connector 1008 and downstream device 1000 has been enumerated as bus powered. When an external power supply is physically connected at connector 1008, bus power supply (Vbus) may be disconnected and an external power supply (VEXT) may be connected to internal power supply node 1018. Further, detect signal path 1036 may be disconnected from internal ground node 1018 and connected to signal voltage VDET. In response to the change on detect signal path 1036, connection detect circuit 1038 may provide a connection indication for hub controller 1012, to enable hub controller 1012 to determine a configuration state (e.g., bus powered or self-powered). Interruption in power due to a disconnection at Vbus and a subsequent power supply connection at connector 1008 may be seen by host as a disconnection event. Subsequently, a host device may request identification information, and downstream device 1000 may transmit identification that may enable it to be (re-)enumerated as self-powered.

In a second operation it is assumed that there is a connection at connector 1008 and downstream device 1000 has been enumerated as self-powered. A second operation may be the opposite of the first. Upon a physical disconnection of an external power supply at connector 1008, detect signal path 1036 is disconnected from signal voltage VDET and connected to internal ground node 1018. Interruption in power due to a disconnection at connector 1008 and a subsequent connection to Vbus may be seen by host as a disconnection event. Subsequently, a host device may request identification information, and downstream device 1000 may transmit identification that enables it to be (re-)enumerated as bus-powered.

In this way, a USB hub device may be enumerated and re-enumerated as self-powered or bus powered by activating a switching device in response to the physical connection or disconnection of an external power supply that provides a connection signal. Such an arrangement may make the presence of a physical connection readily detectable, and not be dependent upon an interruption/switch in a power supply voltage alone to generate a status change indication.

Figure 11A:
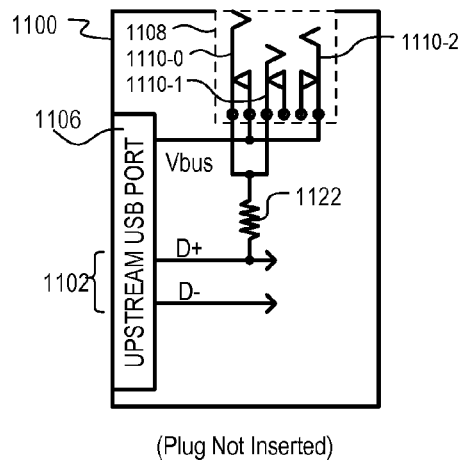
FIGS. 11A to 11C is a schematic diagram of a downstream device according to still another embodiment.
Figure 11B:
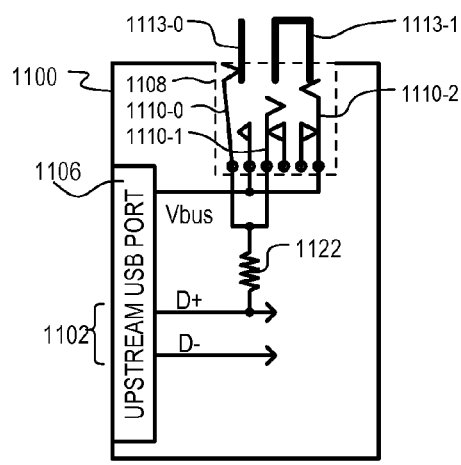
Figure 11C:
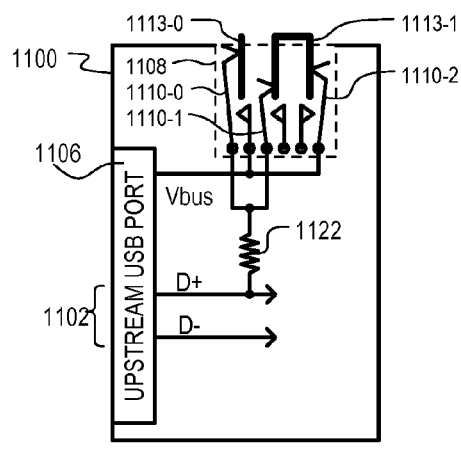

Referring to FIGS. 11A to 11C, a downstream device according to still another embodiment is shown in a block schematic diagram and designated by the general reference character 1100. A downstream device 1100 may include sections like those shown in FIG. 10. Accordingly, like sections are referred to by the same reference character but with the first digits being "11" instead of "10". Downstream device 1100 shows an arrangement in which disconnection of power may be accomplished with a "make-break-make" connection of a bus power supply.

In the very particular embodiment of FIGS. 11A to 11C, a downstream device 1100 may include a connector 1108 having three particular alterable signal paths 1110-0 to 1110-2. A bus power supply Vbus may be provided to path 1110-0 and 1110-2, while a pull-up resistor 1122 may be connected to paths 1110-0 and 1110-1.

Referring to FIG. 11A, when a plug is not inserted into connector 1108, signal path 1110-0 may provide a bus power supply Vbus to pull-up resistor 1122.

Referring to FIG. 11B, when a plug is partially inserted into connector 1108, signal path 1110-0 may open due to first plug member 1113-0 disconnecting bus power supply Vbus from pull-up resistor 1122. Such a disconnection may be interpreted by a host device as a disconnection event.

Referring to FIG. 11C, when a plug is fully inserted into connector 1108, first plug member 1113-0 may continue to open connection 1110-0, preventing Vbus from being applied to a pull-up resistor. In addition, a second plug member 1113-1 may open signal paths 1110-1 and 1110-2. However, second plug member 1113-1 may also provide a new path for bus power supply (Vbus) to pull-up resistor 1122. Such a re-connection may be interpreted by a host device as a re-attachment of downstream device.

In this way, a device may control a configuration by the physical insertion of a plug, or equivalent structure, into a port of a downstream device.

While some embodiments have included USB hub devices, other embodiments may include USB peripheral devices. Some such embodiments will now be described.

Figure 12:
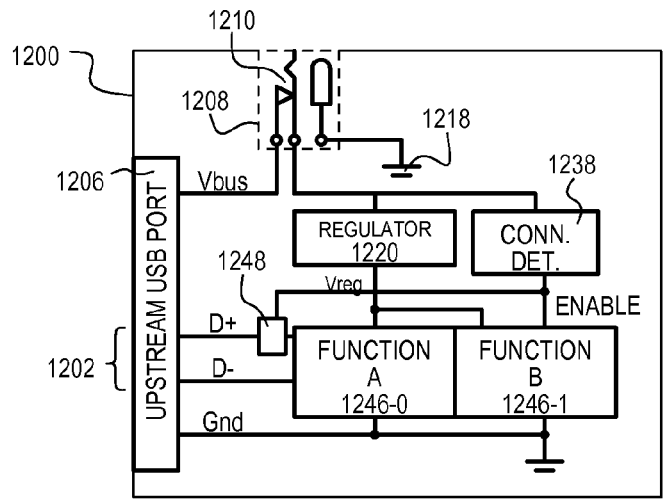
FIG. 12 is a schematic diagram of another downstream device according to an embodiment.

Referring to FIG. 12, a downstream device according another embodiment is shown in a block schematic diagram and designated by the general reference character 1200. A downstream device 1200 may be one example of that shown as 100 in FIG. 1.

A downstream device 1200 may be a USB peripheral device, and may include features like those shown in FIG. 2. Accordingly, like features are referred to by the same reference characters but with the leading digits being "12" instead of "2".

Downstream device 1200 may include multiple function circuits 1246-0 and 1246-1. A function circuit 1246-0 may provide a predetermined function (FUNCTION A), while function circuit 1246-1 may provide another predetermined function (FUNCTION B). Which types of function are executable by downstream device 1200 may depend upon whether a physical connection is made at connector 1208. In the particular arrangement shown, both function circuits (1246-0 and 1246-1) may receive a regulated power supply voltage (Vreg) from a voltage regulator 1220. In addition, function circuit 1246-1 may receive an enable signal (EN-ABLE) from connection detect circuit 1238.

Downstream device 1200 may also have a status indicator circuit 1248. A status indicator circuit 1248 may indicate to a host device of change in connection status. In particular embodiments, a status indicator circuit 1248 may include any of the pull-resistor arrangements of the above embodiments, or equivalents.

Having described the general components of a USB peripheral device 1200, particular operations of such a device will now be described.

It will first be assumed that an external power supply is not connected at connector 1208, thus signal path 1210 may be closed (e.g., physically provide an electrical signal path). Subsequently, a host device (not shown) may be connected (directly or via other devices) at upstream port 1206. Upon detection of USB peripheral device 1200, a host device may request identification information. Peripheral device 1200 may return information that identifies it as having FUNCTION A, but not FUNCTION B (i.e., it is enumerated as a FUNCTION A device).

After USB peripheral device 1200 has been enumerated as having FUNCTION A, an external power supply may be connected at connector 1208. Such a physical connection may open signal path 1210, while providing an external power supply to internal power supply node 1216. Such a switch in power supply may be detected by connection detection circuit 1238, which may generate a status indication for host device, and activate enable signal ENABLE at function circuit 1246-1. Upon detection of the status change indication (e.g., drop at D+), a host device may determine a disconnection and reconnection has occurred, and request identification information from USB peripheral device 1200. USB peripheral device 1200 may return information that identifies the device as now including FUNCTION B, and optionally, not including FUNCTION A (i.e., it is enumerated as a FUNCTION B or FUNCTION A/B device).

A disconnection of an external power supply may be similarly detected to generate a status change indication in the same fashion. Host device may request identification information, and USB peripheral device 1200 may return information that identifies the device as including FUNCTION A, and not including FUNCTION B.

In this way, a USB peripheral device may be enumerated and re-enumerated to include different function sets based on the physical connection or disconnection of an external power supply, without being physically disconnected from a USB host device communication path.

Other embodiments may include peripheral devices with other connector arrangements and/or connection detections arrangement shown the various embodiments herein, and equivalents.

While the embodiment of FIG. 12 shows a USB peripheral device that may alter functions according to a power supply connection, still other embodiments may provide different functions depending upon a connection type other than a power supply connection. One such particular embodiment is shown in FIG. 13.

Figure 13:
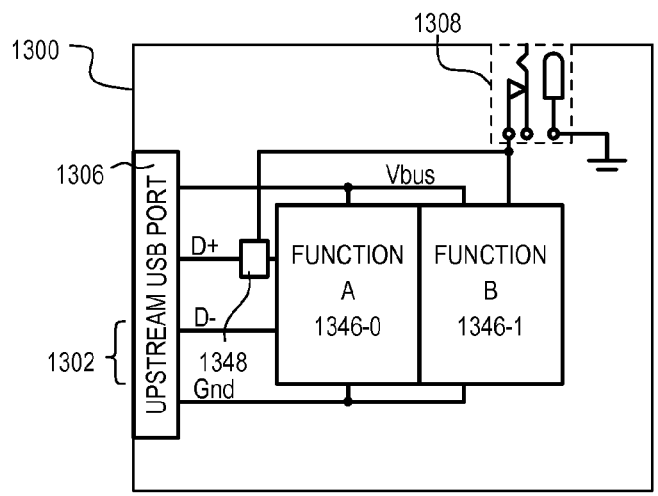
FIG. 13 is a schematic diagram of a downstream device according to still a further embodiment.

Referring to FIG. 13, a USB peripheral device according to another embodiment is shown in a block schematic diagram and designated by the general reference character 1300. Device 1300 may include some of the same features as FIG. 12, thus like features are referred to by the same reference character but with the first two digits being "13" instead of "12".

The embodiment of FIG. 13 may differ from that of FIG. 12 in that a connector 1308 may be a non-power supply connector, and connector may have a physically alterable signal path connected to function circuit 1346-1.

Operations of device 1300 will now be described.

It will first be assumed that there is no connection at connector 1308, thus an alterable signal path 1310 may have one physical state (e.g., closed or opened). Subsequently, a host device (not shown) may be connected (directly or via other devices) at upstream port 1306. Upon detection of USB peripheral device 1300, a host device may request identification information. Peripheral device 1300 may return information that identifies it as having FUNCTION A, but not FUNCTION B.

After USB peripheral device 1300 has been enumerated as having FUNCTION A, a connection may be made at non-power supply connector 1308. Such a physical connection may physically change signal path 1310. Such a change may be detected by second function circuit 1346-1, which may initiate a status change indication, with status indicator circuit 1348. Upon detection of the status change indication (e.g., drop at D+), a host device may determine a disconnection and reconnection has occurred, and request identification information from USB peripheral device 1300. USB peripheral device 1300 may return information that identifies the device as now including FUNCTION B (and optionally, not including FUNCTION A).

In this way, a USB hub peripheral device may be enumerated and re-enumerated to include different function sets based on the physical connection or disconnection at a non-power supply connector, without being physically disconnected from a USB host device communication path.

Figure 14:
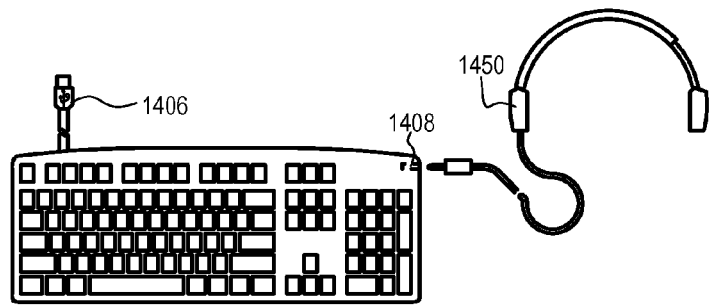
FIG. 14 is a plan view of a downstream device according to a very particular embodiment.

Referring to FIG. 14, one very particular embodiment of a USB peripheral device is shown in a top plan view and designated by the general reference character 1400. USB peripheral device 1400 may be on very particular implementation of that shown in FIG. 13.

A device 1400 may be a keyboard that has a secondary headset function enabled by physical connection of a headset 1450 to a connector 1408 of the keyboard. Accordingly, if the device 1400 is initially attached to a USB host without a headset being plugged in, the device 1400 may be enumerated as being a keyboard without a headset function. However, the physical connection of the headset 1450 to device 1400 may activate a status indication, resulting in the device being re-enumerated as being a keyboard with the headset function. Conversely, if the device 1400 is initially attached to a USB host with a headset being plugged in, the device 1400 may be enumerated as a keyboard with the headset function. However, the subsequent physical disconnection of the headset 1450 may result in the device being re-enumerated as a keyboard without the headset function.

While particular embodiments above have shown the generation of a host status change indication on a D+ communication channel, alternate embodiments may include status indications generated on other host connections. Some possible alternate embodiments are shown in FIGS. 15 to 17.

Figure 15:
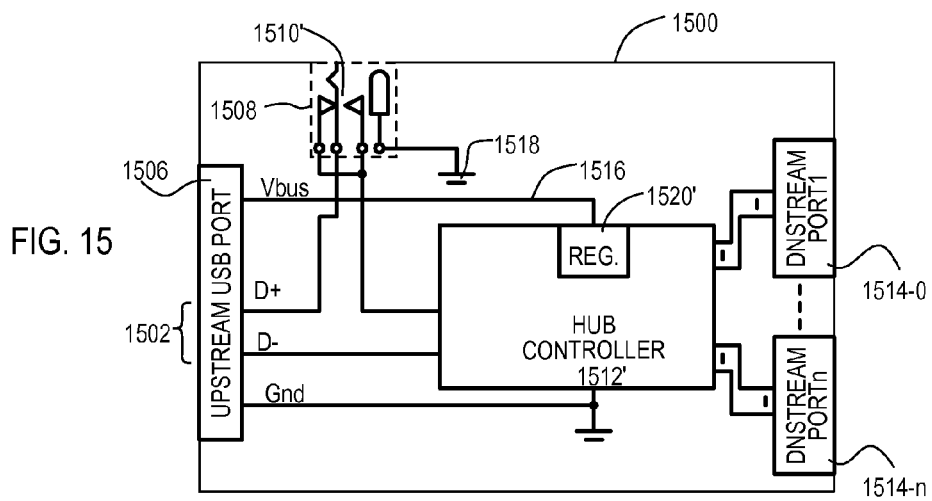
FIG. 15 is a schematic diagram of a downstream device according to an embodiment.
Figure 16:
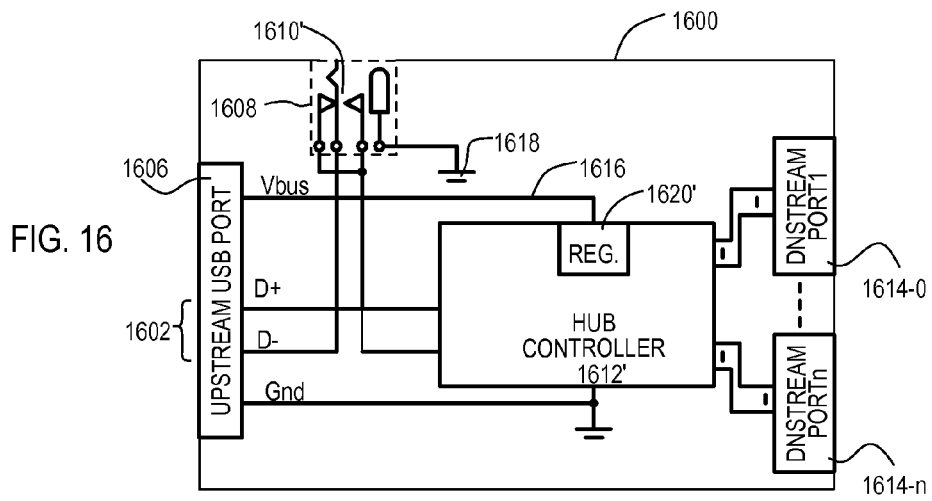
FIG. 16 is a schematic diagram of a downstream device according to another embodiment.
Figure 17:
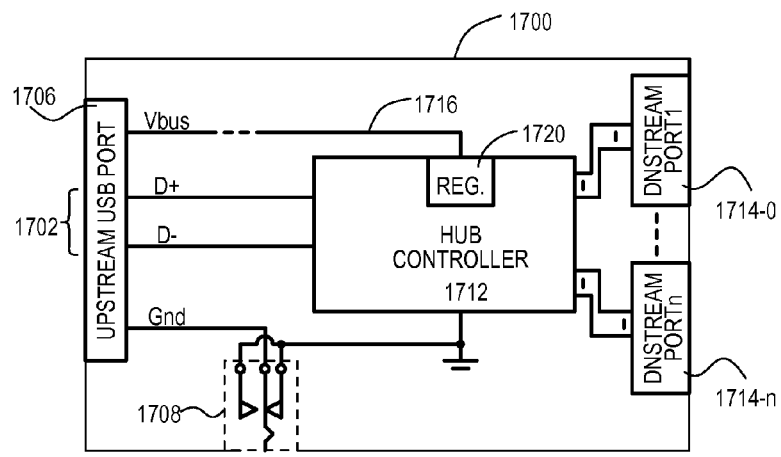
FIG. 17 is a schematic diagram of a downstream device according to another embodiment.

FIGS. 15-17 show embodiments that may include various sections like those shown in FIG. 2, accordingly, like sections are referred to by the same reference character but with the leading digits corresponding to the figure number, instead of being "2".

FIG. 15 shows an embodiment 1500 in which a connector may physically alter the signal path of host communication connection (D+). More particularly, a signal path (D+) may be interrupted in a "make-break-make" type fashion. A connector 1508 may include a single pole double throw (SPDT) type switching arrangement. As a plug is inserted, a left-hand side connection is opened, disconnecting the D+ path. When a plug is completely inserted, a right-hand side connection is closed, re-connecting the D+ signal path. FIG. 16 shows a similar arrangement, but with an alteration of communication connection (D-). FIG. 17 shows an embodiment in which a physically alterable signal path may be a reference power supply (e.g., ground) path. Such changes in signal paths may be used to initiate a status change indication (or themselves may represent a status change indication), resulting in a re-enumeration of the device.

In this way, a device may be enumerated and re-enumerated based on the physical connection or disconnection of various signal paths to a host device, without physically disconnecting a port form the host device.

While some embodiment above have shown connectors that may physically alter a signal path with the insertion of plug (or jack etc.) into a receptacle, other embodiments may include such a plug or connector contained within the device, or connected to the device via a cable. Specific examples of such embodiments will now be described.

Figure 18:
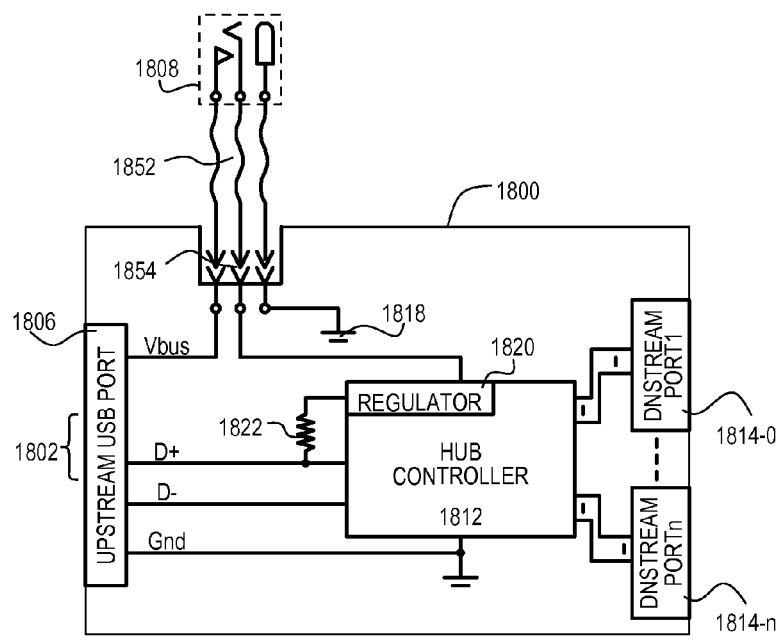
FIG. 18 is a schematic diagram of a downstream device according to another embodiment.

Referring to FIG. 18, a downstream device according to a particular embodiment is shown in a schematic diagram and designated by the general reference character 1800. A downstream device 1800 may be one example of that shown as 100 in FIG. 1.

A downstream device 1800 may include sections like those shown in FIG. 2, accordingly, like sections are referred to by the same reference character but with the leading digits being "18" instead of a "2".

Downstream device 1800 may differ from that of FIG. 2 in that a connector 1808 may be formed at the end of a cable 1852. A cable 1852 may be attached to a device at a direct connection 1854. A direct connection 1854 may be removable, or may be a non-removable connection.

Downstream device 1800 may operate according to embodiments described above, but with the signal path being altered in response to attaching connector 1808 at an end of cable 1854 into a structure. As but one example, a cable 1854 may be inserted into a power supply, at an end opposite to device 1800, to provide an external power supply to downstream device 1800.

In this way, embodiments may include connectors other than receptacles.

Other embodiments may include various different type connector arrangements at an end of a cable as described in other embodiments herein, or equivalents.

Figure 19A:
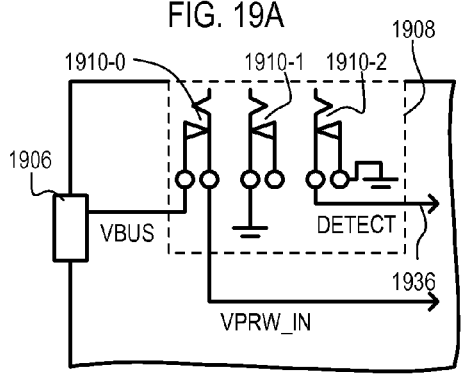
FIGS. 19A and 19B are schematic diagrams showing a plug that may be included in the embodiments.
Figure 19B:
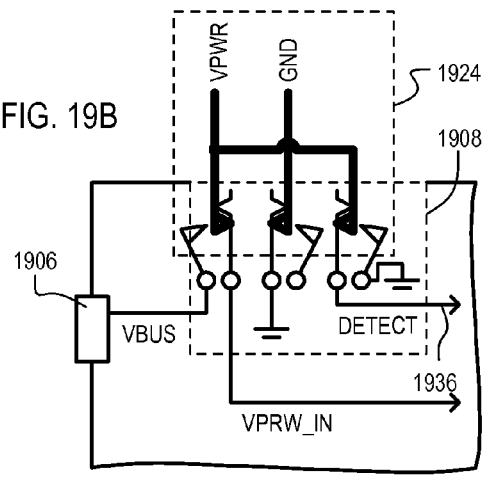

Referring to FIGS. 19A and 19B, another connector arrangement that may be included in the embodiments is shown in a schematic diagram. FIG. 19A shows a receptacle type connector 1908 before insertion of a plug. FIG. 19B shows insertion of plug 1924 into connector 1908. As shown, a plug 1924 may physically alter a signal path between an external power supply VEXT and a detect signal path 1936.

In this way, a physically alterable signal path may be included in a plug structure.

While the embodiments may include devices and systems, alternate embodiments may include methods of configuring a device downstream from a host. Particular such embodiments will now be described.

Figure 20:
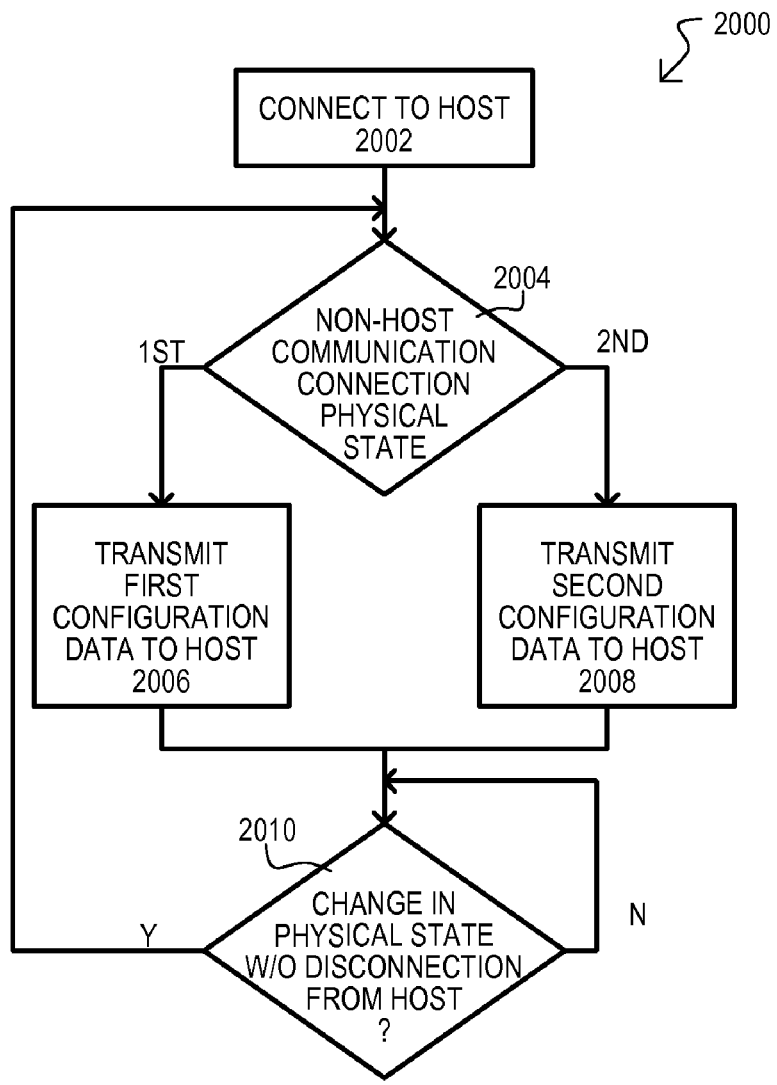
FIG. 20 is a flow diagram of a method according to an embodiment.

Referring to FIG. 20, a method according to one embodiment is shown in a flow diagram and designated by the general reference character 2000. A method 2000 may include connecting a downstream device to a host device (box 2002). A determination may be made about the physical state of a non-host communication signal path (box 2004). If such a signal path has a first state ($1^{ST}$ from 2004), a downstream device may transmit first configuration data to a host device (box 2006). In contrast, if the signal path has a second state ($2^{nd}$ from 2004), a downstream device may transmit second configuration data to a host device (box 2008).

A method 2000 may also include determining if a change in the signal path has been made without a physical disconnection from the host device (box 2010). If such change has been detected (Y from 2010), a method may return to box 2004. If such a change has not been detected (N from 2010), a method may return to monitoring the signal path state (box 2010).

In this way, a downstream device may transmit different configuration data to a host device depending upon a physical change in a connection.

Figure 21:
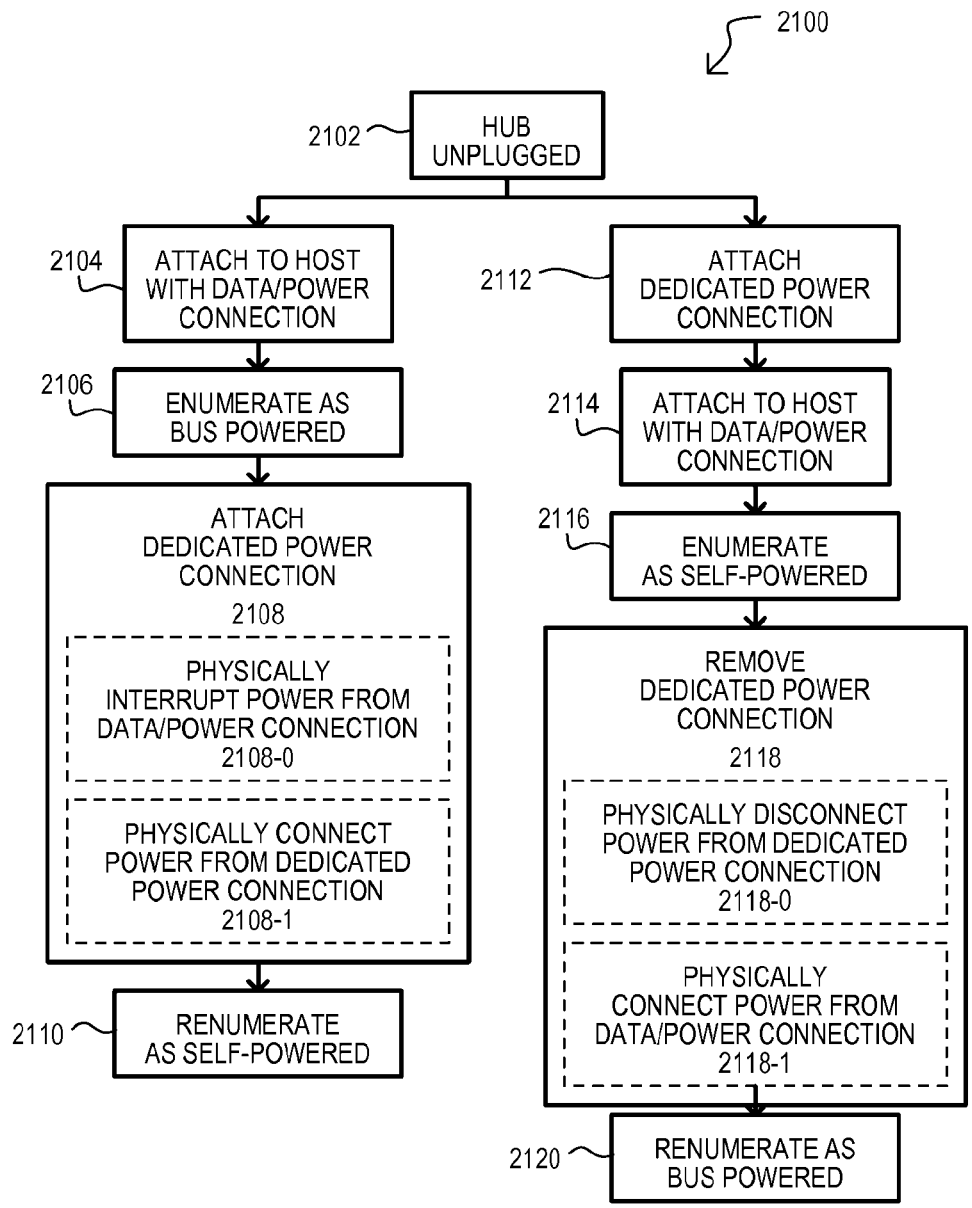
FIG. 21 is a flow diagram of a method according to a further embodiment.

Referring now to FIG. 21, a method for enumerating and re-enumerating a hub device according to a further embodiment is shown in a flow diagram and designated by the general reference character 2100. A method 2100 may include starting with a hub that is unplugged (box 2102). An unplugged hub device may be a hub device that is not connected to a host device or to an external power supply.

A method 2100 may include attaching the hub device to a host device with a data/power connection (box 2104). A data/power connection may provide a data path to a host device as well as supply power from a host device to the hub device.

A method 2100 may include enumerating the hub device as being bus powered (box 2106). Such an action may include the host receiving identification information from the hub device indicating that the hub device currently operates on power received from the host device.

A method 2100 may also include attaching a dedicated power supply connection (box 2108). Such an action may include physically interrupting power from the data/power connection (box 2108-0) and physically connecting power from the dedicated power supply connection (box 2108-1). A dedicated power supply connection may not provide a path for host communications to the hub device, or any other device in communication with the host device.

Following a connection of a dedicated power supply connection, a method 2100 may include re-enumerating the hub device as being self-powered (box 2110). Such an action may include the host receiving identification information from the hub device indicating that the hub device currently operates, all or in part, on power received from the external connection.

Referring still to FIG. 21, from a host unplugged state (box 2102), a method 2100 may also include attaching a dedicated power supply to the hub device (box 2112). With an external power supply connection attached, a method 2100 may include attaching the hub device to a host device with a data/power connection (box 2114). A hub device may then be enumerated as self-powered (box 2116).

A dedicated power supply connection may be removed (box 2118). Such an action may include physically interrupting power from the dedicated power connection (box 2118-0) and physically enabling a power supply path from the data/power connection (box 2118-1).

Following a disconnection of a dedicated power supply connection, a method 2100 may include re-enumerating the hub device as being bus-powered (box 2120).

In this way, a hub device may be enumerated between being self-powered or bus powered based on a connection of a dedicated power supply altering a physical signal path.

It is noted that while embodiments above have shown arrangements in which a downstream device provides a status change indication by forcing a value on a communication link (e.g., D+), alternate embodiments may include different types of status change indications, depending upon the particular communications protocol with a host. As but a few of the many possible examples, a status change indication may be particular type of data packet generated in response to a physically altered signal path, a control code transmitted in response to the same, or a particular value transmitted in a particular channel (such channels including but not limited to, physically separate communication links, or time multiplexed channels on a same link).

It is further noted that while USB embodiments above have shown host communication channels D+/D− compatible with both a USB 2.0 and USB 3.0 standard, the embodiments should not construed as being limited to any particular version. Along these same lines, status change indications and/or signal connections/disconnections may be generated on a one-way USB communication link (e.g., SSRX+ and/or SSRX−).

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A method comprising:
   transmitting, with an apparatus, a bus-powered configuration to a host device over a communication bus when the apparatus is powered through the communication bus;
   in response to a power supply being coupled to the apparatus, disconnecting the communication bus from powering the apparatus before the apparatus receives power from the power supply; and
   transmitting, with the apparatus, a self-powered configuration to the host device when the apparatus is powered by the power supply.

2. The method of claim 1, wherein disconnecting the communication bus from powering the apparatus further comprises electrically decoupling a path from the communication bus to a controller in the apparatus.

3. The method of claim 2, wherein electrically decoupling the path from the communication bus to the controller in the apparatus further comprises separating conductive members in a port capable of coupling the apparatus and the power supply.

4. The method of claim 1, further comprising:
   connecting the communication bus to power the apparatus in response to the power supply being decoupled from the apparatus; and
   transmitting, with the apparatus, the bus-powered configuration to the host device.

5. The method of claim 4, wherein connecting the communication bus to power the apparatus further comprises electrically coupling a path from the communication bus to a controller in the apparatus.

6. An apparatus comprising:
   a first connector to receive a first supply voltage through a connection to a host device;
   a controller to enumerate a bus-powered configuration with the host device through the connection in response to the controller receiving the first supply voltage from the first connector through a signal path; and
   a second connector to detachably couple with a power supply to receive a second supply voltage, wherein the second connector is configured to disconnect the signal path between the first connector and the controller in response to a coupling between the second connector and the power supply and before the second connector receives the second supply voltage, and wherein the controller is configured to enumerate a self-powered configuration with the host device through the connection in response to the controller receiving the second supply voltage from the second connector.

7. The apparatus of claim 6, where the apparatus is a universal serial bus (USB) compatible hub device, and or a USB compatible peripheral device.

8. The apparatus of claim 6, wherein the second connector includes further comprising:
   a first conductive member connected to the connection to receive the first supply voltage; and
   a second conductive member connected to an internal power supply node to receive the second supply voltage, the first and second conductive members being physically separated from one another in response to the physical connection of the power supply at the second connector.

9. The apparatus of claim, wherein the first and second conductive members are physically coupled together in response to the physical disconnection of the power supply and the second connector.

10. The apparatus of claim 6, wherein the signal path is disposed between the first connector and the power supply.

11. The apparatus of claim 6, wherein the second connector applies a predetermined voltage on a detect input in response to the physical connection.

12. The apparatus of claim 6, wherein the second connector further comprising:
a first switching connection configured to disable a first power supply path to the controller in response to an insertion of a member into the apparatus; and
a second switching connection configured to enable a second power supply path to the controller in response to the insertion of the member into the apparatus.

13. The apparatus of claim 6, wherein the controller is configured to enumerate with the host device in response to a prompt from the host device.

14. The apparatus of claim 6, wherein the second connector further comprises a receptacle structure configured to detachably receive an insertion of a plug.

15. The apparatus of claim 14, wherein the signal path is included within the receptacle structure or the plug.

16. The apparatus of claim 6, wherein the second connector further comprises a movable member configured to change position in response to insertion of a member into a receptacle of the apparatus.

17. An apparatus comprising:
an upstream port having a bus power supply input and at least one host communication connection;
a connector having a self-power supply input and an electrical signal path that is physically alterable in response to a mechanical connection or disconnection to the connector; and
a controller circuit that switches between a first mode of operation and a second mode of operation in response to the mechanical connection at the connector to disconnect the electrical signal path before power is supplied to the self-power supply input.

18. The apparatus of claim 17, wherein the mechanical connection at the connector mechanically disconnects the bus power supply input from the controller circuit and mechanically connects the self-power supply input to the controller circuit, and wherein the mechanical disconnection at the connector mechanically connects the bus power supply input to the controller circuit and mechanically disconnects the self-power supply input from the controller circuit.

19. The apparatus of claim 17, wherein the controller circuit includes a connection detection circuit that activates a connection indication on at least the host communication connection in response to physical alteration of the electrical signal path.

20. The apparatus of claim 17, further comprising:
at least one downstream port having a bus power supply output and at least one downstream communication connection, wherein the mechanical connection at the connector mechanically connects the self-power supply input to the bus power supply output, and wherein the mechanical disconnection at the connector mechanically disconnects the self-power supply input from the bus power supply output.

* * * * *